(12) United States Patent
Lowe et al.

(10) Patent No.: US 12,011,946 B2
(45) Date of Patent: Jun. 18, 2024

(54) TRANSACTION CARDS WITH DISCONTINUOUS METAL STRATA

(71) Applicant: CompoSecure, LLC, Somerset, NJ (US)

(72) Inventors: Adam Lowe, Somerset, NJ (US); John Esau, Marlboro, NJ (US)

(73) Assignee: CompoSecure, LLC, Somerset, NJ (US)

( * ) Notice: Subject to any disclaimer, the term of this patent is extended or adjusted under 35 U.S.C. 154(b) by 0 days.

(21) Appl. No.: 17/928,695

(22) PCT Filed: May 27, 2021

(86) PCT No.: PCT/US2021/034426
§ 371 (c)(1),
(2) Date: Nov. 30, 2022

(87) PCT Pub. No.: WO2021/247353
PCT Pub. Date: Dec. 9, 2021

(65) Prior Publication Data
US 2023/0234390 A1   Jul. 27, 2023

Related U.S. Application Data

(60) Provisional application No. 63/032,911, filed on Jun. 1, 2020.

(51) Int. Cl.
*B42D 25/373* (2014.01)
*B42D 25/305* (2014.01)
(Continued)

(52) U.S. Cl.
CPC ......... *B42D 25/373* (2014.10); *B42D 25/305* (2014.10); *B42D 25/351* (2014.10);
(Continued)

(58) Field of Classification Search
CPC .. B42D 25/373; B42D 25/305; B42D 25/351; B42D 25/36; G06K 19/041; G06K 19/04;
(Continued)

(56) References Cited

U.S. PATENT DOCUMENTS

| 8,725,589 B1 | 5/2014 | Skelding et al. |
| 8,756,680 B2 | 6/2014 | Shashidhar |

(Continued)

FOREIGN PATENT DOCUMENTS

| EP | 0982121 A1 | 3/2000 |
| JP | 11316810 A | 11/1999 |

(Continued)

OTHER PUBLICATIONS

Erb et al., "Uniform metal nanostructures with long-range order via three-step hierarchical self-assembly", Science Advances, vol. 1, No. 10, Nov. 6, 2015, 8 pages.

(Continued)

*Primary Examiner* — Justin V Lewis
(74) *Attorney, Agent, or Firm* — Buchanan, Ingersoll & Rooney PC (57) ABSTRACT

A transaction card having a discontinuous metal stratum with a desired degree of electrical eddy current disruption disposed on a surface of a first layer, such as a glass or other transparent layer. A transaction module disposed in the first layer is electrically isolated from the discontinuous metal stratum. The discontinuous metal stratum may include a plurality of isolated metal features that form a halftone pattern, such as a pattern that is visibly opaque to the naked eye.

43 Claims, 2 Drawing Sheets

(51) Int. Cl.
  *B42D 25/351* (2014.01)
  *G06K 19/04* (2006.01)
  *G06K 19/07* (2006.01)
  *G06K 19/077* (2006.01)

(52) U.S. Cl.
  CPC ....... *G06K 19/041* (2013.01); *G06K 19/0723* (2013.01); *G06K 19/07769* (2013.01)

(58) Field of Classification Search
  CPC ............... G06K 19/0723; G06K 19/07; G06K 19/07769; G06K 19/077
  USPC .............. 283/72, 74, 75, 77, 83, 94, 98, 901
  See application file for complete search history.

(56) References Cited

U.S. PATENT DOCUMENTS

| | | | |
|---|---|---|---|
| 9,269,032 | B2 | 2/2016 | Zlotnik et al. |
| 9,390,366 | B1 | 7/2016 | Herslow et al. |
| 10,583,594 | B2 | 3/2020 | Lowe |
| 10,762,412 | B2 | 9/2020 | Lowe et al. |
| 2006/0009251 | A1 | 1/2006 | Noda et al. |
| 2007/0138303 | A1 | 6/2007 | Asakura et al. |
| 2017/0116808 | A1* | 4/2017 | Kobrin ................... B42D 25/36 |

FOREIGN PATENT DOCUMENTS

| | | |
|---|---|---|
| JP | 11353442 A | 12/1999 |
| JP | 2000062093 A | 2/2000 |
| JP | 2006024087 A | 1/2006 |
| JP | 2007219902 A | 8/2007 |
| WO | 2008011108 A2 | 1/2008 |
| WO | 2015183243 A1 | 12/2015 |

OTHER PUBLICATIONS

International Search Report and Written Opinion for International Application No. PCT/US2021/034426, dated Oct. 4, 2021, 17 pages.

U.S. Appl. No. 62/623,936, mailed Feb. 7, 2018, 13 pages.

U.S. Appl. No. 62/971,439, mailed Nov. 10, 2020, 44 pages.

International Preliminary Report on Patentability and Written Opinion for International Application No. PCT/US2021/034426, issued Dec. 6, 2022, 13 pages.

Japanese Notice of Reasons for Rejection for Japanese Application No. 2022-573685 mailed Dec. 5, 2023 with translation, 6 pages.

* cited by examiner

TRANSACTION CARDS WITH DISCONTINUOUS METAL STRATA

CROSS-REFERENCE TO RELATED APPLICATION

This application is a U.S. National Phase Patent Application of PCT Patent Application No. PCT/US2021/034426, filed May 27, 2021, which is related to and claims priority to U.S. Provisional Patent Application No. 63/032,911, filed Jun. 1, 2020, entitled TRANSACTION CARDS WITH DISCONTINUOUS METAL STRATA, the contents of each of which are incorporated herein by reference in their entireties for all purposes.

BACKGROUND OF THE INVENTION

Transaction cards comprising glass have been described in numerous patents and applications, including but not limited to U.S. Pat. Nos. 9,269,032 and 8,756,680. Likewise, transaction cards comprising metal have been described in numerous patents and applications, including but not limited to U.S. Pat. No. 9,390,366. One design consideration for metal cards having a contactless or dual interface transaction capabilities, is that the metal in the metal layer tends to create electromagnetic interference that may affect operability in the contactless mode. One advantage of a metal card is the overall weight, look and feel of the card, which is desired by consumers. While the U.S. Pat. No. 9,390,366 provides one construction that maximizes contactless operability while maintaining the desirability of metal, there remains a need in the field for development of cards with unique aesthetic appeal, maximized operability, and efficient manufacturing cost.

While various combinations of metal and glass layers in transaction cards have been disclosed, such as in U.S. Pat. No. 8,725,589, the combination of metal and glass provides unique opportunities for new constructions to meet the continued desire in the field for metal-containing cards with unique aesthetics and maximized operability in contactless mode.

SUMMARY OF THE INVENTION

One aspect of the invention comprises a transaction card, comprising at least a first glass layer, a discontinuous metal stratum disposed on a first surface of the glass layer and having a desired degree of electrical eddy current disruption, and a contact, contactless, or dual interface transaction module disposed in the first glass layer and electrically isolated from the discontinuous metal stratum.

In one embodiment, the discontinuous metal stratum may comprise a metal layer having a plurality of discontinuities, which discontinuities may form a pattern, such as a halftone pattern, in which the plurality of discontinuities may be configured to avoid synchronization of eddy currents of adjacent metal regions in the presence of less than a predetermined level of energy, such as a maximum rated field strength of a contactless transaction card reader.

In another embodiment, the discontinuous metal stratum may comprise a plurality of isolated metal features, which may form a pattern, such as a halftone pattern, in which each of the plurality of metal features is separated from adjacent metal features by at least a predetermined minimum distance, such as a distance calculated to avoid bridging of energy between adjacent halftone dots in the presence of less than a predetermined level of energy, such as a maximum rated field strength of a contactless transaction card reader.

The halftone pattern in the discontinuous metal stratum may comprise the plurality of metal features or discontinuities evenly distributed across the first surface of the card, or the halftone pattern may comprise the plurality of metal features, plurality of discontinuities, or a combination thereof having an uneven distribution, wherein the uneven distribution forms a halftone image. The halftone pattern may include a combination of metal features and non-metal features. In some embodiments, the halftone pattern forms a discontinuous layer that is perceived perceptible to by the human eye as a continuous opaque layer.

Some embodiments may comprise a second layer of glass. In such embodiments, the discontinuous metal stratum may be disposed between the first glass layer and the second glass layer. A metallized booster antenna may be disposed on a surface of the second glass layer, electrically isolated from the discontinuous metal stratum on the first layer of glass, and coupled to or configured to couple to the payment module. In some embodiments, the metallized booster antenna may be disposed on an inner surface of the second glass layer arranged between the first glass layer and the second glass layer, such as with an electrically isolating (e.g. non-metal) layer disposed between the discontinuous metal stratum and the metallized booster antenna. In other embodiments, the metallized booster antenna may be disposed on an outer surface of the second glass layer facing away from the first glass layer.

In still other embodiments, the discontinuous metal stratum is disposed on a first outer surface of the first glass layer, and the metallized booster antenna is disposed on a second outer surface of the first glass layer.

A protective coating may be disposed over the metallized antenna. The metallized booster antenna may be transparent, such as an antenna comprising indium tin oxide (ITO).

An electrical isolating material may be disposed between adjacent metal features in the discontinuous metal stratum. The glass may comprise a flexible or conformable glass, such as an aluminosilicate, borosilicate, boro-aluminosilicate glass, sapphire glass, or ion-exchange-strengthened glass. Additional layers of the card may include a printed ink layer, a laminated layer, a laser patterned layer, a coated layer, a photolithographic layer, a printed OLED layer, an embedded electronics layer, or a vacuum deposited layer.

Another aspect of the invention comprises a transaction card having a first layer, a discontinuous metal stratum disposed on a first surface of the first layer and comprising a plurality of isolated metal features that form a halftone pattern; and a contact, contactless, or dual interface transaction module disposed in the first layer and electrically isolated from the discontinuous metal stratum. Each of the plurality of metal features is separated from adjacent metal features by at least a predetermined minimum distance calculated to avoid bridging of energy between adjacent halftone dots in the presence of less than a predetermined level of energy, such as the maximum field strength of a contactless transaction card reader. The first layer may comprise a non-metal layer, such as a transparent material. The halftone pattern may be perceptible to the human eye as a continuous opaque layer that hides visibility of an underlying layer, such as an underlying metal layer having a plurality of discontinuities.

According to embodiments of the aspects of the invention, the discontinuous metal stratum may include one or more transparent areas that permit visibility of an underlying surface or layer of the card. The underlying surface or layer visible through the transparent area includes another discontinuous metal stratum.

DETAILED DESCRIPTION OF THE INVENTION

Figure 1A:
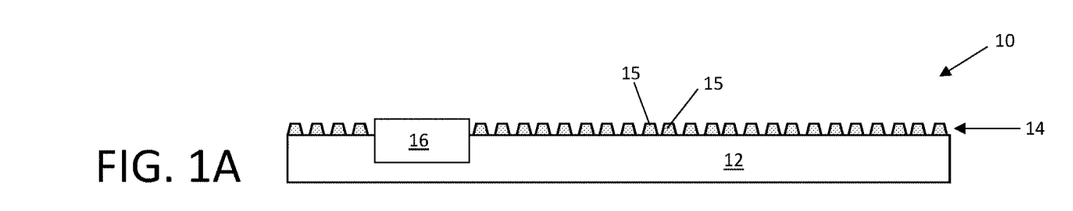
FIG. 1A is a cross-sectional illustration of a portion of an exemplary glass layer of a transaction card having a discontinuous metal stratum.
Figure 1B:
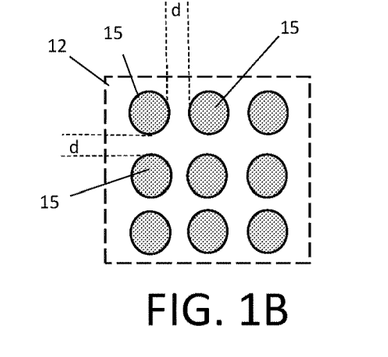
FIG. 1B is a plan view illustration of an exemplary portion of the card portion of FIG. 1A, illustrating isolated features on the core layer.

Referring now to FIGS. 1A and 1B, portion 10 of a transaction card comprises a substrate 12, a discontinuous metal stratum 14 comprising a plurality of isolated features 15, and a transaction module 16. As referred to herein, the transaction module may be any module configured for conducting any type of transaction, capable of contact-only, contactless-only, or dual interface (contact and contactless) interaction with a card reader, and in particular a transaction module configured for conducting financial transactions (sometimes referred to as a "payment module"), such as are commonly found in credit cards, debit cards, and the like. Contactless modules typically use radio frequency (RF) communications and comprise radio frequency identification (RFID) integrated circuits that operate in compliance with the ISO/IEC 14443 international standard for contactless smart card communications. The invention is not limited to any particular type of transaction card, or transaction module, however.

Substrate 12 is preferably a glass layer, such as but not limited to a flexible or conformable glass, such as an aluminosilicate, borosilicate, boro-aluminosilicate glass, sapphire glass, or ion-exchange-strengthened glass. Numerous examples of such flexible or conformable glasses are known in the art, and are favored for their shatter-resistant properties and strength. Such glasses are also denser than traditional plastic layers found in some transaction cards, and therefore lend additional heft or weight to the overall look and feel of a card. Although preferred embodiments comprise flexible or conformable glass compositions, the term "glass" as used herein refers to any material having any non-polymeric chemical composition (i.e. non-plastic), typically inorganic, and typically containing SiO2 as a primary component, that is transparent or semi-transparent, including amorphous non-crystalline compounds as well as crystalline compounds, sometimes also referred to as "crystal." Additionally, acceptable glass layers may include glass varieties known as "safety glass," including laminated glass (comprising one or more layers each of glass and plastic, typically held together by an interlayer), toughened (tempered) glass and engraved glass. While glass layers having transparency or semi-transparency may have certain advantages, embodiments of the invention may include embodiments with cores comprising other non-metal or non-plastic materials (e.g. ceramic) that are opaque or only translucent. Although depicted as a monolithic layer, the core layer may comprise a composite of multiple material layers, including multiple glass layers of the same or different types of glass.

Discontinuous metal stratum 14 is preferably comprises a plurality of isolated metal features 15. The term "stratum" is used herein consistent with the Latin meaning of something "spread or laid down," to reflect that in at least some embodiments, the isolated metal features do not form a contiguous layer in the same way as a bulk metal layer or foil layer. In other embodiments, disclosed herein later, however, the discontinuous metal stratum may indeed comprise a layer with an adequate amount of electrical eddy current disruption between adjacent metal regions, but may form a contiguous layer. In some embodiments, the isolated metal features are isolated from the moment of formation, whereas in others, a metal layer may be processed to create the electrical eddy current disruption between features, which may comprise a distance of empty space that provides isolation.

Suitable metals for the metal stratum may include aluminum, silver, copper, gold, rhodium, tungsten, titanium and alloys of the foregoing, including alloys that contain non-metallic elements (e.g. titanium nitride), including non-metallic elements for creating a desired color effect, but the invention is not limited to any particular metal or metal alloy. For example, numerous colored surface coatings in different colors may be obtained, e.g., via PVD, such as: gold (TiN), rose gold (ZrN), bronze (TiAlN), blue (TiAlN), black (TiAlCN), as well as a dark red (ZrN). The metal features may also or instead be heat treated to obtain a desired color. Although depicted as having a round cross section, it should be understood that the features may have any cross section. Likewise, while depicted as having a frustoconical shape in longitudinal section, the features may have any geometry in longitudinal section, including hemispherical, and having round or flat tops. The term "isolated" is intended to mean that each metal feature is separated from adjacent metal features by at least a predetermined minimum distance "d" as depicted in FIG. 1B. Preferably, the predetermined minimum distance between adjacent features is a distance calculated to avoid bridging of energy between adjacent halftone dots in the presence of less than a predetermined level of energy. In embodiments in which the metal features are not isolated, the features otherwise have a sufficient degree of electrical eddy current disruption relative to one another to avoid syncing of eddy currents of adjacent metal regions at the predetermined level of energy in a way that disrupts the communications for processing the transaction at a desired distance between the card and the card reader. The predetermined energy level may coincide with the typical maximum rated field strength of a contactless transaction card reader. For example, the typical energy density found in a Point of Service (POS) terminal for contactless processing a transaction card at the extremes may include a range of 0.5-12.5 A/m² (amperes per square meter).

The plurality of isolated metal features in the discontinuous metal stratum preferably form a halftone pattern. The halftone pattern may be defined by the plurality of metal features evenly distributed across the surface of the card, or the plurality of metal features may have an uneven distribution, wherein the uneven distribution forms a halftone image. As is known in the art, halftone is a technique that uses a plurality of dots so small and spaced so closely together that the human eye interprets the plurality of dots as a continuous-tone. The size and/or spacing of the halftone dots may also be varied to generate a gradient-like effect between light tones and dark tones. Halftoning is typically used as a reprographic technique, such as in the field of printing, in which the gradient of tones between light and dark may be used to form grayscale images. Likewise, combinations of grayscale images printed with different color inks (e.g. Cyan, Yellow, Magenta and black in a CYMK color scheme) in halftone patterns may be combined to form full color printed content. In traditional printing, the gradient between light and dark may span from lighter tones in which each printed "dot" is isolated from each adjacent dot, to darker tones in which the printed dots are so close together that the adjacent dots of ink connect to one another with holes comprising the absence of ink being isolated from one another. In embodiments of the invention in which isolation between the metal features is essential to minimize effects caused by the metal stratum on RF communications, a majority or at least substantial portions of metal features preferably conform a metallization pattern in which each "dot" in the halftone pattern is isolated from adjacent dots. However, in embodiments in which gradients in tone are combined to create a visual image, at least some portions of the halftone image may comprise portions of the metallization pattern in which some of the halftone dots connect to another other. In general, however, the metallization pattern is disposed to avoid creating a continuous path of metal within at least select areas of the card, and preferably between an edge of the card and the periphery of the payment module. A combination of a halftone pattern of discrete metal features in one area, and discontinuities in a bulk or foil metal in another area, may also be provided.

The metal features may be deposited by any method known in the art, including but not limited to physical or chemical vapor deposition processes by which the dots are created directly on the glass substrate, deposition of a solid layer or a foil on the substrate and etching away metal from the between the remaining features, or printing, such as using inkjet, lithographic, or additive manufacturing (i.e. 3D printing) processes. For example, in one embodiment, a photoresist may be disposed on the substrate, exposed through a mask with actinic radiation (e.g. UV) to cure the exposed portions of the photoresist, and the uncured portions removed. Then, the metal may be deposited using a deposition process (e.g. CVD or PVD) that creates the metal features on the substrate in the areas where there is no photoresist, and deposits the metal on the photoresist where the photoresist remains. The photoresist is then removed, leaving the metal features. In the foregoing, the mask is a negative mask that allows the actinic radiation through holes in the mask that coincide to the spaces between the metal features, so that the cured photoresist remains on the substrate in the areas where it is not desired to deposit the metal features. In another process, a continuous metal layer is disposed on the substrate, such as with a PVD or CVD process, a photoresist deposited over the metal layer, and the resist exposed to actinic radiation through a positive mask that has holes corresponding to the metal features. The uncured photoresist is removed, and an etching process is conducted, which etches away the metal in the areas not protected by the photoresist. The photoresist is then removed, leaving the metal features, In still other embodiments, the metal features may be formed from continuous solid metal layer, and unwanted portions of the metal removed by focused energy, such as a laser or an e-beam (focused electron beam), leaving only the metal features. In still other embodiments, the metal features may be formed by metal particles contained in a curable or sinterable resin. In another embodiment, dot-shaped or wire-like metal nanostructures may be prepared in an array as a self-assembled monolayer on a diblock copolymer template, as described in Erb et al., "Uniform metal nanostructures with long-range order via three-step hierarchical self-assembly," *Science Advances*, Vol. 1, no. 10 (6 Nov. 2015), incorporated herein by reference.

Although embodiments with isolated metal features have been primarily described, it should be understood that inverse designs may also provide sufficient electrical eddy current disruption between metal regions to permit sufficient RF transmissivity through the discontinuous metal stratum. For example, as shown in FIG. 1D, an array of holes 12 in metal layer 15 may be coupled with one or more elongated discontinuities or slits, such as one or more lines 13, one or more of which preferably extends to a periphery of the card or which is in communication with a non-metal area that extends to the periphery of the card. Multi-slit designs in a metal layer are described, generally in U.S. Provisional Application Ser. No. 62/971,439, filed Feb. 7, 2020, titled "DI METAL TRANSACTION DEVICES AND PROCESSES FOR THE MANUFACTURE THEREOF," incorporated herein by reference. In another embodiment that provides open space between metal features in which at least some of the open space is isolated from and not in communication with adjacent open space, a micro- or nano-mesh may be prepared and bonded to the substrate. Such metal mesh patterns may also benefit from the use of multiple slits or elongated discontinuities to break up metal regions that would otherwise form interconnected metal regions, and eddy currents associated therewith, extending across a relatively large portion of the card.

It should be understood that although in some embodiments card portion 10 may comprise a freestanding card without more, in other embodiments portion 10 may include one or more additional decorative or functional layers not depicted in FIG. 1A, including printed layers, protective layers, and layers containing other functional or aesthetic features common to transaction cards, including but not limited to security features such as holograms, codes (such as bar codes or QR codes), magnetic stripes, signature blocks, printed layers, embossed layers, embedded electronics, and the like. Methods for embedding electronics in cards, generally, are described in U.S. application Ser. No. 16/441,363, filed Jun. 14, 2019, titled OVERMOLDED ELECTRONIC COMPONENTS FOR TRANSACTION CARDS AND METHODS OF MAKING THEREOF, filed 27 Jul. 2016, and related applications to which priority is claimed or that claim priority therefrom, all of which are incorporated herein by reference. Additional layers may also include one or more of: a printed ink layer, a laminated layer, a laser patterned layer, a coated layer, a photolithographic layer, a printed OLED layer, or a vacuum deposited layer.

The relative sizes of the various features as depicted in FIG. 1 (and in any of the figures herein depicted) are not intended to be to scale.

Figure 1C:
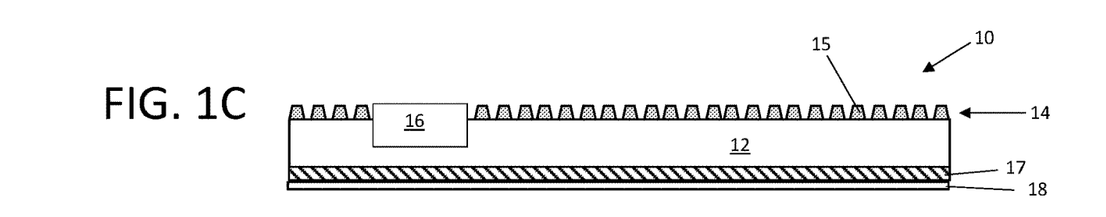
FIG. 1C is a cross-sectional illustration of a transaction card having a discontinuous metal stratum on one surface and a metallized antenna on the opposite surface.
Figure 1D:
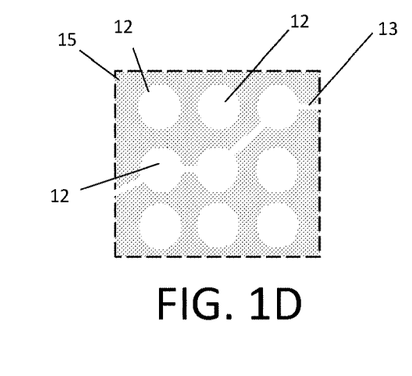
FIG. 1D is a plan view illustration of an exemplary portion of a card having a continuous metal layer interrupted by holes in the metal layer.

Referring now to FIG. 1C, a card embodiment is depicted comprising card portion 10, comprising first glass layer 12, a discontinuous metal stratum 14 disposed on one surface of glass layer 12, and a metallized antenna 17 disposed on the opposite surface of the glass layer. Transaction module 16 is disposed in the first glass layer 12. In other embodiments, additional decorative or functional layers may be present in any portion of the stack, such as a protective coating 18 (preferably clear) over the metallized antenna 17, such as UV- or thermally-cured polymeric compounds, sometimes referred to as potting compounds. The metallized booster antenna 17 may be transparent, such as formed from indium tin oxide (ITO). The metallized antenna 17 may be created by any method known in the art, including deposition of a continuous metal stratum on the glass surface, and etching away portions of the metal to leave the desired antenna structure. The booster antenna 17 inductively couples with or is physically electrically connected to the transaction module 16 to improve communication performance.

Figure 2:
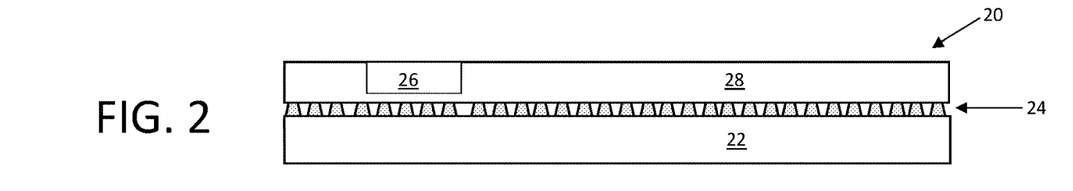
FIG. 2 is a cross-sectional illustration of a portion of an exemplary transaction card embodiment having two glass layers and a discontinuous metal stratum.

Referring now to FIG. 2, a card embodiment 20 is depicted having a first glass layer 22, a discontinuous metal stratum 24 as described above, and a second glass layer 28, with a transaction module 26 disposed in the first glass layer 22. The metal stratum 24 is disposed on the first glass layer 22 between the first glass layer 22 and the second glass layer 28. This location of the discontinuous metal stratum 24 as an inner stratum sandwiched between outer layers of glass layers 22, 28 protects the metal stratum 24 from wear and tear. In other embodiments, additional decorative or functional layers may be present in any portion of the stack. Although the transaction module 26 is depicted as disposed entirely in the first glass layer 22, other embodiments may include the transaction module 26 extending through the discontinuous metal stratum 24 into the second glass layer 28. While the transaction module 26 is depicted as having a top surface flush with an outer surface of the card 20, such as is typical for contact or dual interface modules, a contactless-only module may be disposed entirely beneath the top surface of the card 20. Exemplary cards having the designs as described herein may include cards with transaction modules that are contact only, contactless only, or dual interface (DI).

Figure 3:
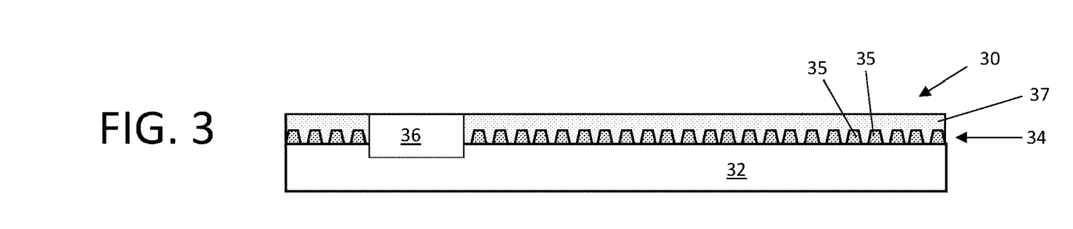
FIG. 3 is a cross-sectional illustration of a portion of an exemplary glass layer of a transaction card having a coating disposed over the discontinuous metal stratum.

Referring now to FIG. 3, card embodiment 30 has a first glass layer 32, a discontinuous metal stratum 34 as described above, a protective layer 37, and a transaction module 36 disposed in the first glass layer 32 with a top surface flush with the top surface of the protective layer 37. The protective layer 37 as depicted fills gaps between the metal features 35 and is disposed over the discontinuous metal stratum 34. It should be understood that in some embodiments, the protective layer 37 may fill gaps between the metal features 35 but not extend as a covering over the discontinuous metal stratum 34, and in other embodiments, the protective layer 37 may extend over the discontinuous metal stratum 34 but not between the metal features 35. In still other embodiments, the protective layer 37 may only partially fill gaps between the metal features 35. Protective layer 37 is preferably a non-metal layer that acts as an electrical isolator and insulator, and the effects of the isolation and insulation may enable a smaller spacing between features with less interference with RF communications than without the isolation/insulation layer. In other embodiments, additional decorative or functional layers may be present in any portion of the stack. To the extent necessary or desired, the protective layer 37 may comprise an IR-blocking compound, particularly in any implementations that benefit from such a blocker in order to confirm to card ATM standards. For example, the embodiment depicted in FIG. 3 may include a metallized antenna layer as depicted in FIG. 1C, with or without a protective layer 37 over the metallized antenna layer.

Figure 4:
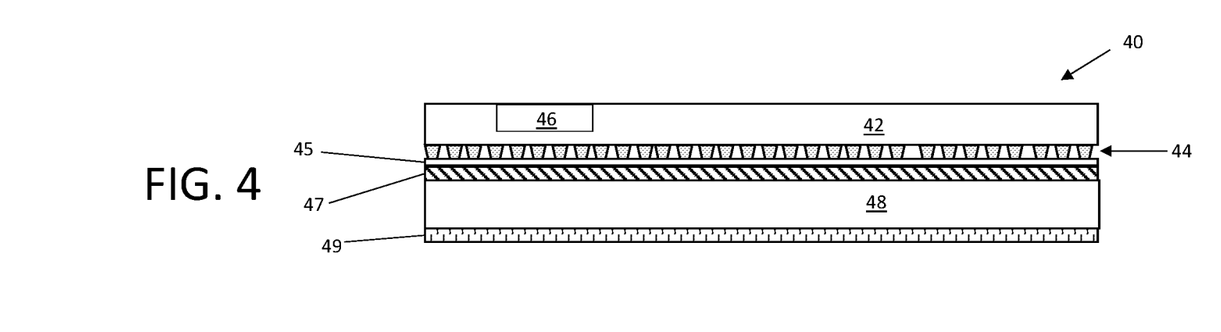
FIG. 4 is a cross-sectional illustration of a portion of an exemplary transaction card embodiment having two glass layers, a discontinuous metal stratum, and a metallized antenna layer.

Referring now to FIG. 4, card embodiment 40 includes a first glass layer 42, a discontinuous metal stratum 44, a payment module 46 disposed in the first glass layer 42, a second glass layer 48, and a metallized antenna layer 47 disposed over the second glass layer 48. The discontinuous metal stratum 44 and the metallized antenna 47 are both disposed on the inner surfaces of the respective first and second glass layers 42, 48 facing one another, and may include a non-metal layer 45 (e.g. a PVC, PET, or other polymer layer and/or an adhesive layer) disposed between the discontinuous metal stratum 44 and the metallized antenna 47 to insulate and isolate the antenna layer 47 from the discontinuous metal stratum 44. Layer 49, on the outer surface of the second glass layer 48 may comprise a printed ink layer, a laminated layer, a laser patterned layer, a coated layer, a photolithographic layer, a printed OLED layer, or a vacuum-deposited layer. Additional decorative or functional layers may also be present in any portion of the stack. In some embodiments, the laminated layer may be a metal layer, preferably an RF invisible or nearly invisible metal layer, such as an otherwise continuous metal layer having one or more discontinuities in the nature of elongated slits, as described in U.S. Prov. App. Ser. No. 62/971,439, referenced above.

Although not limited to any particular constructions, the metal features 15 are preferably disposed on the glass layer with a density of at least 32 dots per inch (DPI) (12.6 dots per centimeter (dpcm)), and may be in a range of 32 to 6.5E14 DPI (12.6-2.56E14 dpcm)(the current technical upper limit of e-beam lithography), and more preferably in a range of 480-4800 DPI (190-1900 dpcm), in embodiments in which the halftone pattern is intended to give the discontinuous layer an opaque visual appearance. Notably, the term DPI (or dpcm) typically relates to the number of dots per unit of linear horizontal measure, whereas LPI (or lines per inch) typically relates to the number of horizontal lines per unit of linear vertical measure in printing processes. Many printing processes have different capabilities in one direction relative to the other. As used herein, the metrics DPI or dpcm are intended to refer to either or both horizontal or vertical dimensions, with horizontal referring to the relatively longer dimension of a card, and vertical referring to the relatively shorter dimension of a card.

Other embodiments may include features 15 with a size large enough to be visually perceptible to the human eye to form an intended pattern, which may include geometric arrangements of dots, or visual patterns formed using pointillist artistic techniques that create an image. Features 15 may be provided in combinations of different types of metal, or metal and non-metal, with the different types of features having different color tones for graphical/artistic purposes. For example, dots may range from a metal with a silver tone (e.g. Aluminum) to a metal with a black tone (e.g. black ruthenium or black nickel) to create a 2-tone graphic.

The use of more than two different color tones may be used to create visual images with the different tones, including with tones to create or approximate 4-color printed images. For example, a color palate of metallic substances, such as ZrN (red), TiAlN (blue), TiN (gold), and TiAlCN (black) may be used to approximate the corresponding separations of a CMYK image. In combinations of metal and non-metal, the non-metal may comprise, for example, an ink with the same tone as the metal, so that visual effects incorporating darker tones may be formed by non-metal features in order to permit the metal features to remain at a predetermined spacing. In other embodiments, non-metal inks may be used in combination with a metal halftone pattern to fill in for one or more colors in a 4-color separation. For example, a 4-color image may be formed of a combination of features in yellow and black formed from a conductive (or relatively more conductive) metal (e.g. gold for yellow and black nickel for black) and magenta and cyan formed from non-conductive (or relatively less conductive) ink. In other embodiments, however, darker tones and lighter tones may be formed solely by metal features, with some areas in relatively darker tones comprising metal halftone dots that are not entirely separated from one another within the dark tonal area, and relatively lighter tonal areas in which the plurality of metal halftone dots are all separated from one another.

Relatively lighter and darker areas may be formed by FM or AM dot frequency modulation, wherein FM modulation entails using the same size dot throughout a visual pattern, wherein changes in spacing of the dots to form changes in tone, and AM modulation entails using different size dots at a same relative spacing on center to form changes in tone. Combinations of AM and FM modulation, such as are known in the field of halftone printing, may also be used, such as in which AM modulation is used for one part of the tonal range and FM modulation used for another.

Although discussed primarily herein with respect to use of a plurality of electrically insulated features on a glass layer, it should be understood that the methods as described herein may be performed on any type of substrate, including non-glass transparent (or translucent) polymer substrates, such as but not limited to polyethylene terephthalate (PET), including but not limited to high-density polyester (HDPE), low density polyester (LDPE), and glycol-modified polyester (PETG)), polycarbonate, acrylic (polymethlamethacrylate), butyrate (cellulose acetate butyrate), glass-reinforced epoxy laminate material (e.g. FR4), polypropylene, and polyether ether ketone (PEEK), as well as non-transparent/non-translucent substrates, including ceramic. In some embodiments, it may be desirable to use a halftone pattern as described herein to hide underlying layers, such as layers with discontinuities, such as described in U.S. Provisional Patent Application Ser. No. 62/971,439, titled DI METAL TRANSACTION DEVICES AND PROCESSES FOR THE MANUFACTURE THEREOF, and in U.S. application Ser. No. 15/928,813, filed on Mar. 22, 2018, (status: pending), which claims priority to U.S. Application No. 62/623,936, filed Jan. 30, 2018, both titled DI CAPACITIVE EMBEDDED METAL CARD, all of the foregoing incorporated herein by reference for all purposes.

Figure 5:
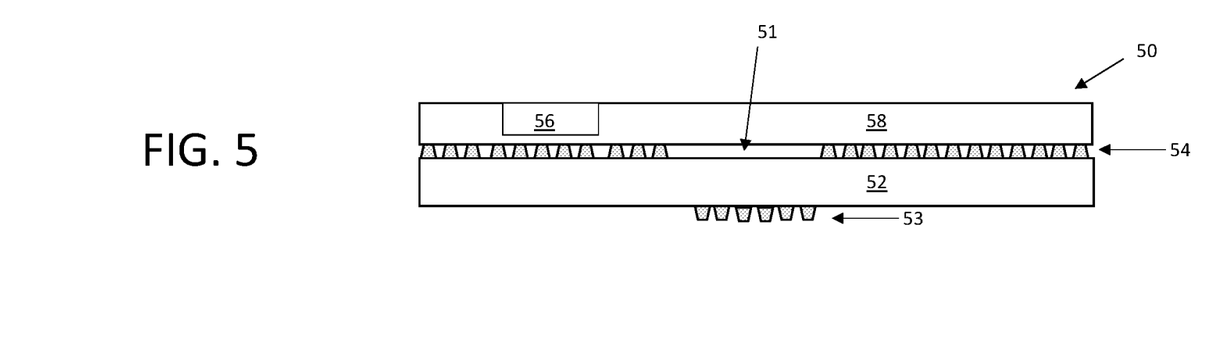
FIG. 5 is a cross-sectional illustration of a portion of an exemplary transaction card embodiment having multiple glass layers and multiple discontinuous metal strata.

Embodiments may comprise a combination of a first transparent layer having a discontinuous metal stratum comprising isolated metal features and a second transparent layer comprising a discontinuous metal stratum comprising a metal layer with a plurality of discontinuities. Cards may also include one or more transparent layers with a discontinuous stratum comprising isolated metal features in one area of the stratum and continuous metal region with a plurality of discontinuities in another area. Some regions of a transparent layer may have an absence of metal to permit transparency to another layer of the card (including transparency in a first metal stratum on a first surface of the layer that permits visibility of a second metal stratum on a second surface of the layer). Multiple transparent layers, each with corresponding discontinuous strata covering less than all of one or more surfaces of each layer, may include areas of transparency that provide visibility to an underlying surface or layer in a combination of patterns that create to create a 3-dimensional optical effect. Thus, for example, as depicted in FIG. 5, card 50 may have a first transparent layer 58, in which transaction module 56 is embedded. A second transparent layer 52 may have a first discontinuous metal stratum 54 disposed on a first surface thereof, and an absence of metal in area 51, that permits visibility of second discontinuous metal stratum 53 on the opposite surface of layer 52. Although not shown, a further transparent (non-metallized) area in stratum 53 may be present that permits visibility to an additional underlying layer (not shown). In embodiments having transparent portions, the transparent portions may be rendered sufficiently non-transmissive (i.e. to meet the ISO/IEC 10373 standard) for blocking the infrared (IR) wavelengths used by card-sensing devices (e.g. automatic teller machines (ATMs), which typically use LEDs with 860 or 950 nm wavelengths). IR blocking capabilities may be conferred by additives in the transparent materials that form the substrate (or another layer), a coating, or a layer having IR-filtering properties.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A transaction card, comprising:
    at least a first glass layer;
    a discontinuous metal stratum disposed on a first surface of the glass layer and having a degree of electrical eddy current disruption, the discontinuous metal stratum comprising a metal layer having a plurality of discontinuities that is configured to avoid synchronization of eddy currents of adjacent metal regions when a predetermined level of energy is present; and
    a contact, contactless, or dual interface transaction module disposed in the first glass layer and electrically isolated from the discontinuous metal stratum.

2. The transaction card of claim 1, wherein the plurality of discontinuities form a pattern.

3. The transaction card of claim 1, wherein discontinuous metal stratum comprise a plurality of isolated metal features.

4. The transaction card of claim 3, wherein the plurality of isolated metal features form a pattern.

5. The transaction card of claim 3, wherein each of the plurality of metal features is separated from adjacent metal features by at least a predetermined minimum distance.

6. The transaction card of claim 5, wherein the predetermined minimum distance is a distance calculated to avoid bridging of energy between adjacent halftone dots when less than a predetermined level of energy is present.

7. The transaction card of claim 1, wherein the predetermined level of energy comprises a maximum field strength of a contactless transaction card reader.

8. The transaction card of claim 1, wherein the discontinuous metal stratum is disposed on a first outer surface of the first glass layer.

9. The transaction card of claim 3, further comprising an electrical isolating material disposed between adjacent metal features in the discontinuous metal stratum.

10. The transaction card of claim 1, wherein the first layer of glass comprises a flexible or conformable glass.

11. The transaction card of claim 1, further comprising one or more additional layers.

12. The transaction card of claim 11, wherein the one or more additional layers is selected from the group consisting of: a printed ink layer, a laminated layer, a laser patterned layer, a coated layer, a photolithographic layer, a printed OLED layer, an embedded electronics layer, or a vacuum deposited layer.

13. The transaction card of claim 1, wherein the discontinuous metal stratum includes one or more transparent areas that permit visibility of an underlying surface or layer of the card.

14. The transaction card of claim 13, wherein the underlying surface or layer visible through the one or more transparent areas includes another discontinuous metal stratum.

15. The transaction card of claim 1, wherein the discontinuous metal stratum comprises a metal layer having a plurality of holes, the plurality of holes being coupled with one or more elongated discontinuities.

16. The transaction card of claim 1, wherein the one or more
elongated discontinuities extend to a periphery of the card or in communication with a non-metal area that extends to the periphery of the card.

17. A transaction card, comprising:
at least a first glass layer;
a discontinuous metal stratum disposed on a first surface of the glass layer and having a degree of electrical eddy current disruption, the discontinuous metal stratum comprising a metal layer having a plurality of discontinuities that from a pattern comprising
a halftone pattern; and
a contact, contactless, or dual interface transaction module disposed in the first glass layer and electrically isolated from the discontinuous metal stratum.

18. The transaction card of claim 17, wherein the halftone pattern comprises the plurality of metal features or discontinuities evenly distributed across first surface of the card.

19. The transaction card of claim 17, wherein the halftone pattern comprises the plurality of metal features, plurality of discontinuities, or a combination thereof having an uneven distribution, wherein the uneven distribution forms a halftone image.

20. The transaction card of claim 17, wherein the halftone pattern includes a combination of metal features and non-metal features.

21. The transaction card of claim 17, wherein the halftone pattern forms is perceptible to a human eye as a continuous opaque layer.

22. A transaction card, comprising:
at least, a first glass layer;
a discontinuous metal stratum disposed on a first surface of the glass layer and having a degree of electrical eddy current disruption;
a contact, contactless, or dual interface transaction module disposed in the first glass layer and electrically isolated from the discontinuous metal stratum; and
a second layer of glass.

23. The transaction card of claim 22, wherein the discontinuous metal stratum is disposed between the first glass layer and the second glass layer.

24. The transaction card of claim 22, further comprising a metallized booster antenna disposed on a surface of the second glass layer, the metallized booster antenna coupled to or configured to couple to the transaction module and electrically isolated from the discontinuous metal stratum on the first layer of glass.

25. The transaction card of claim 24, wherein the metallized booster antenna is disposed on an inner surface of the second glass layer arranged between the first glass layer and the second glass layer.

26. The transaction card of claim 24, further comprising an electrically isolating layer disposed between the discontinuous metal stratum and the metallized booster antenna.

27. The transaction card of claim 26, wherein the electrically isolating layer comprises a non-metal layer.

28. The transaction card of claim 24, wherein the metallized booster antenna is disposed on an outer surface of the second glass layer facing away from the first glass layer.

29. The transaction card of claim 28, further comprising a protective coating over the metallized antenna.

30. The transaction card of claim 24, wherein the metallized booster antenna is transparent.

31. The transaction card of claim 30, wherein the metallized antenna comprises indium tin oxide (ITO).

32. The transaction card of claim 22, wherein one or both of the first layer of glass and the second layer of glass comprises a flexible or conformable glass.

33. A transaction card, comprising:
at least a first glass layer;
a discontinuous metal stratum disposed on a first outer surface of the glass layer and having a degree of electrical eddy current disruption; and
a contact, contactless, or dual interface transaction module disposed in the first glass layer and electrically isolated from the discontinuous metal stratum;
a metallized booster antenna disposed on a second outer surface of the first glass layer, the metallized booster antenna coupled to or configured to couple to the transaction module.

34. A transaction card, comprising:
at least a first glass layer;
a discontinuous metal stratum disposed on a first surface of the glass layer and having a degree of electrical eddy current disruption;
a contact, contactless, or dual interface transaction module disposed in the first glass layer and electrically isolated from the discontinuous metal stratum; and
an electrical isolating material disposed over the discontinuous metal stratum.

35. A transaction card, comprising:
at least a first glass layer including a flexible or conformable glass, the flexible glass comprising an aluminosilicate, borosilicate, boro-aluminosilicate glass, sapphire glass, or ion-exchange-strengthened glass;
a discontinuous metal stratum disposed on a first surface of the glass layer and having a degree of electrical eddy current disruption; and
a contact, contactless, or dual interface transaction module disposed in the first glass layer and electrically isolated from the discontinuous metal stratum.

36. A transaction card, comprising:
at least a first glass layer;
a discontinuous metal stratum disposed on a first surface of the glass layer and having a degree of electrical eddy current disruption;
a contact, contactless, or dual interface transaction module disposed in the first glass layer and electrically isolated from the discontinuous metal stratum; and a second surface of the first glass layer is in contact with an additional layer selected from the group consisting of:
a printed ink layer, a laminated layer, a laser patterned layer, a coated layer, a photolithographic layer, a printed (SLED layer, an embedded electronics layer, or a vacuum deposited layer.

37. A transaction card, comprising:
a first layer;
a discontinuous metal stratum disposed on a first surface of the first layer and comprising a plurality of isolated metal features, the plurality of isolate metal features forming a halftone pattern and each of the plurality of isolated metal features is separated from adjacent metal features by at least a predetermined minimum distance calculated to avoid bridging of energy between adjacent isolated metal features when less than a predetermined level of energy is present; and
a contact, contactless, or dual interface transaction module disposed in the first layer and electrically isolated from the discontinuous metal stratum.

38. The transaction card of claim 37, wherein the predetermined level of energy comprises a maximum field strength of a contactless transaction card reader.

39. The transaction card of claim 37, wherein the first layer comprises a non-metal layer.

40. The transaction card of claim 39, wherein the non-metal layer comprises a transparent material.

41. A transaction card, comprising:
a first layer comprising a non-metal layer;
a discontinuous metal stratum disposed on a first surface of the first layer and comprising a plurality of isolated metal features, the plurality of isolated metal features forming a halftone pattern;
a contact, contactless, or dual interface transaction module disposed in the first layer and electrically isolated from the discontinuous metal stratum; and
an underlying layer disposed beneath the non-metal layer, wherein the halftone pattern is perceptible to a human eye as a continuous opaque layer that hides visibility of the underlying layer.

42. The transaction card of claim 41, wherein the underlying layer comprises a metal layer.

43. The transaction card of claim 42, wherein the underlying metal layer comprises a plurality of discontinuities.

* * * * *

UNITED STATES PATENT AND TRADEMARK OFFICE
CERTIFICATE OF CORRECTION

Page 1 of 1

PATENT NO. : 12,011,946 B2
APPLICATION NO. : 17/928695
DATED : June 18, 2024
INVENTOR(S) : Adam Lowe and John Esau It is certified that error appears in the above-identified patent and that said Letters Patent is hereby corrected as shown below:

In the Claims

In Claim 18, Column 11, Line 41, "across" should state --across a--

In Claim 36, Column 13, Line 6, "(SLED" should state --OLED--

Signed and Sealed this
Seventh Day of January, 2025

Derrick Brent
*Acting Director of the United States Patent and Trademark Office*